Nov. 6, 1962 D. J. PURYEAR 3,061,915
HOSE REMOVING TOOL
Filed May 17, 1961
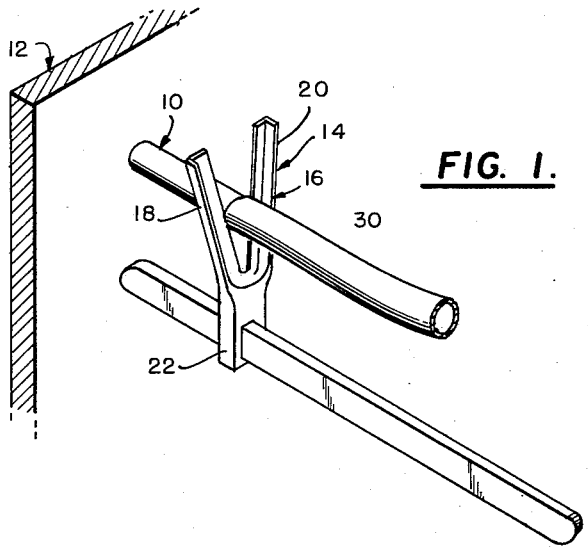
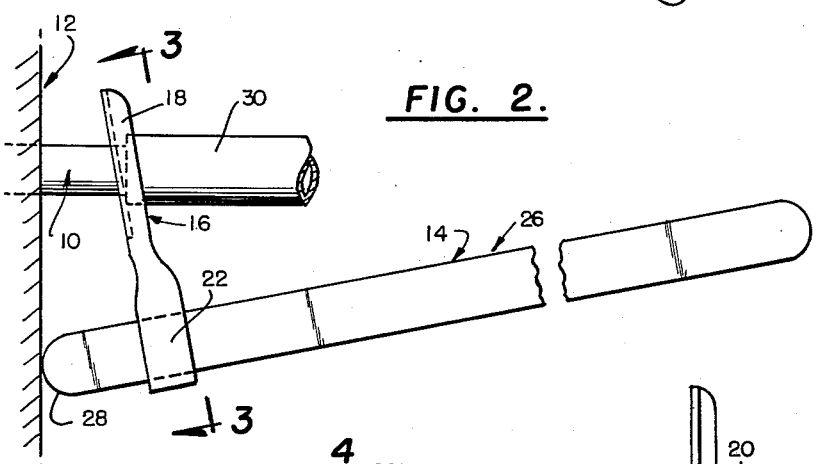
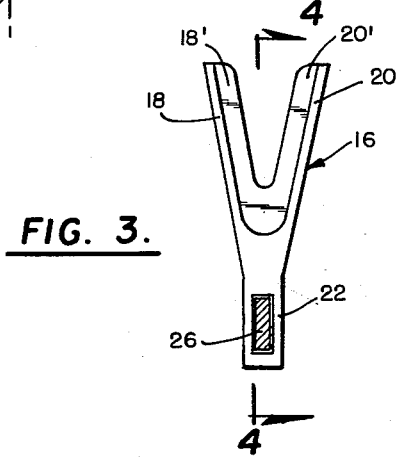
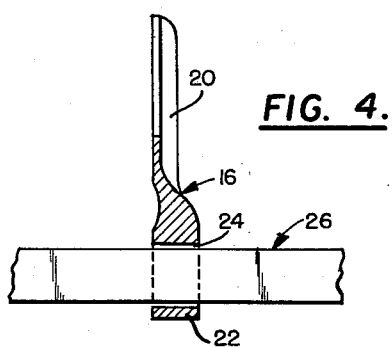
INVENTOR
Dewey J. Puryear United States Patent Office 3,061,915
Patented Nov. 6, 1962

1

3,061,915
HOSE REMOVING TOOL
Dewey J. Puryear, 914 E. 48½ St., Austin 5, Tex.
Filed May 17, 1961, Ser. No. 110,750
2 Claims. (Cl. 29—235)

The present invention relates to a tool for removing a length of hose from a pipe.

It often becomes necessary to remove a length of hose from the end of a pipe for various reasons. Due to the fact that a rubber hose when stretched narrows in diameter, the hose clings tightly to the pipe and generally has to be cut away before it can be removed.

An object of the present invention is to provide a tool that enables a user to quickly and easily remove a hose from a pipe without damage to either the hose or the pipe.

Another object of the present invention is to provide a tool for removing a hose from a pipe that is instantly adjustable.

These and other objects will be apparent from the following description when considered with the drawing, in which:

FIG. 1 is a perspective view of the tool of the present invention, showing it in use, FIG. 2 is a side elevational view of the assembly of FIG. 1, on a larger scale, FIG. 3 is a view on line 3—3 of FIG. 2, and FIG. 4 is a view on line 4—4 of FIG. 3.

In the drawing, a pipe 10 is shown in FIGS. 1 and 2 projecting from a fixed surface 12.

The tool of the present invention, designated generally by the numeral 14, comprises a Y-shaped member 16 having arms 18 and 20 and a stem 22 formed integrally with the arms 18 and 20.

The arms 18 and 20 are L-shaped when viewed from the end with one leg of each L facing inwardly and parallel to the fixed surface 12 as at 18' and 20' in FIG. 3.

The stem 22 is provided with an opening 24 through which is slidably placed a handle 26 having one end 28 rounded so as to bear against the surface 12 when the tool is being used to remove a hose from the end of a piece of pipe projecting from a fixed surface. The inward edge of legs 18' and 20' of the arms 18 and 20 are adapted to bear against the end of a hose 30 on the pipe 10, as in FIGS. 1 and 2 so that downward pressure on the handle element 26 will pry the hose 30 from the pipe 10.

It will be readily seen that the handle element 26 will wedge itself in the stem bore 24 in any position of its sliding adjusted movement relative to the stem 22.

While only a single embodiment of the invention is here shown and described, other embodiments are contemplated and numerous changes and modifications may be made without departing from the spirit of the invention as set forth in the appended claims.

What is claimed is:

1. A tool for removing a hose from a pipe comprising an upright Y-shaped member adapted to embracingly receive between the arms thereof a pipe having a hose end portion thereon, said member arms being of L-shaped cross-sectional configuration with the one leg of each arm facing inwardly, said member arms being adapted to engage the end of the hose, and a handle element slidably extending through the stem of said member and having one end adapted to bear against a fixed surface to which the pipe is secured for prying said hose portion from said pipe.

2. A hose removing tool of the character described, comprising a Y-shaped member having arms that are L-shaped when viewed from the end thereof, one leg of each arm parallel to but not touching a fixed surface from which projects the end of a piece of pipe having a hose thereon which it is desired to remove from the said pipe, the said Y-shaped member having the said arms terminate in a downwardly extending stem that is provided with a rectangular opening for the slidable placement of a handle having rounded ends one of which normally bears against the said fixed surface when hand pressure is downwardly applied to the other end of the said handle thereby causing the inward edge of each said leg to bear against the said hose and forcing the said hose off the end of the said pipe.

References Cited in the file of this patent

UNITED STATES PATENTS

| 300,968 | Hatfield | June 24, 1884 |
| 781,638 | Doan | Feb. 7, 1905 |
| 2,556,343 | Shearer | June 12, 1951 |